US011747132B2

(12) United States Patent
Dhand et al.

(10) Patent No.: US 11,747,132 B2
(45) Date of Patent: Sep. 5, 2023

(54) METHODS AND APPARATUS FOR DECOMPOSITION TO ACCOUNT FOR IMPERFECT BEAMSPLITTERS

(71) Applicant: Xanadu Quantum Technologies Inc., Toronto (CA)

(72) Inventors: Ish Dhand, Ulm (DE); Shreya Prasanna Kumar, Ulm (DE); Dylan Mahler, Toronto (CA); Blair Morrison, Toronto (CA); Lukas Helt, Toronto (CA); Leonhard Neuhaus, Ingolstadt (DE)

(73) Assignee: Xanadu Quantum Technologies Inc., Toronto (CA)

( * ) Notice: Subject to any disclaimer, the term of this patent is extended or adjusted under 35 U.S.C. 154(b) by 34 days.

(21) Appl. No.: 17/554,711

(22) Filed: Dec. 17, 2021

(65) Prior Publication Data

US 2022/0196382 A1 Jun. 23, 2022

Related U.S. Application Data

(60) Provisional application No. 63/130,148, filed on Dec. 23, 2020.

(51) Int. Cl.
*G01B 9/02015* (2022.01)
*G01B 9/02* (2022.01)

(52) U.S. Cl.
CPC ..... *G01B 9/02015* (2013.01); *G01B 9/02051* (2013.01)

(58) Field of Classification Search
CPC ............ G01B 9/02015; G01B 9/02051; G01B 9/02055
See application file for complete search history.

(56) References Cited

U.S. PATENT DOCUMENTS

| 2017/0031101 | A1* | 2/2017 | Miller | G02B 6/29395 |
| 2017/0351293 | A1* | 12/2017 | Carolan | G06E 3/005 |
| 2019/0086610 | A1* | 3/2019 | Clements | H04B 10/2581 |
| 2021/0063136 | A1* | 3/2021 | Islam | G01B 9/02007 |

OTHER PUBLICATIONS

Kondratyev, I.V. et al. "Multiport universal unitary interferometer design". AIP Conference Proceedings 2241, 020022, Jun. 23, 2020. (Year: 2020).*
Clements, W. R. et al., "An Optimal Design for Universal Multipart Interferometers," Physics. Optics, University of Oxford, England (2017), 8 pages; https://arxiv.org/abs/1603.08788v2.
Reck, M., et al., "Experimental Realization of Any Discrete Unitary Operator," Physical Review Letters, 73(1):58-61 (1994).

* cited by examiner

*Primary Examiner* — Michael A Lyons
(74) *Attorney, Agent, or Firm* — Cooley LLP

(57) ABSTRACT

A method includes receiving a representation of an N-mode interferometer and a representation of at least one imperfection associated with the N-mode interferometer at a processor, N being a positive integer value. The processor identifies multiple two-mode interferometers and multiple phases based on the representation of the N-mode interferometer and the representation of the at least one imperfection. The multiple two-mode interferometers and the multiple phases are configured to apply a unitary transformation to an input signal. The method also includes sending a signal to cause at least one of storage or display of a representation of the multiple two-mode interferometers and a representation of the multiple phases.

18 Claims, 11 Drawing Sheets

US 11,747,132 B2

METHODS AND APPARATUS FOR DECOMPOSITION TO ACCOUNT FOR IMPERFECT BEAMSPLITTERS

CROSS-REFERENCE TO RELATED PATENT APPLICATION

This application claims priority to and the benefit of U.S. Provisional Application No. 63/130,148, filed Dec. 23, 2020 and titled "Methods and Apparatus for Decomposition to Account for Imperfect Beamsplitters," the disclosure of which are incorporated herein by reference in their entireties.

FIELD

The present disclosure is related to the implementation of linear optics unitaries. More specifically, one or more embodiments relate to performing decompositions that account for imperfect splitting ratios on beamsplitters on a linear optical interferometer.

BACKGROUND

Known decomposition algorithms rely on sequentially nulling elements of an unitary matrix and nulling elements thereof until only a diagonal matrix remains. Such decompositions, however, assume that it is feasible to perfectly implement the desired transformation on an interferometer. This may not be possible, for instance, when the beamsplitters on the chip are not perfectly balanced.

SUMMARY

In some embodiments, a method includes receiving at a processor a representation of an N-mode interferometer and a representation of at least one imperfection associated with the N-mode interferometer, N being a positive integer value. The processor identifying multiple two-mode interferometers and multiple phases based on the representation of the N-mode interferometer and the representation of the at least one imperfection. The multiple two-mode interferometers and the multiple phases are configured to apply a unitary transformation to an input signal. The method also includes sending a signal to cause at least one of storage or display of a representation of the multiple two-mode interferometers and a representation of the multiple phases.

BRIEF DESCRIPTION OF THE DRAWINGS

The drawings primarily are for illustration purposes and are not intended to limit the scope of the subject matter described herein. The drawings are not necessarily to scale; in some instances, various aspects of the disclosed subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

As discussed above, known decomposition algorithms typically assume that it is feasible to perfectly implement a desired transformation using an interferometer. Interferometers, however, can have imperfections that have not previously been accounted for a priori, and that result in degraded performance. One or more embodiments facilitate the high-fidelity implementation of a desired linear optics unitary on an interferometer comprising beamsplitters having imperfect splitting ratios. In some such embodiments, imperfections are accounted for by decomposing the desired unitary into matrices that can be either implemented exactly or closely approximated using imperfect optical elements. One or more embodiments described herein are shown to improve the accuracy of the implemented unitary by up to two orders of magnitude, for reasonably sized interferometers, as compared to known approaches. One or methods described herein are also shown to be robust to (or effective despite) imprecision in the measurement of the beamsplitters and to variation of the splitting ratios across the interferometer. Methods for inferring imperfect splitting ratios on a chip (e.g., to inform the decomposition methods) are also disclosed herein.

I. SUMMARY

Figure 1A:
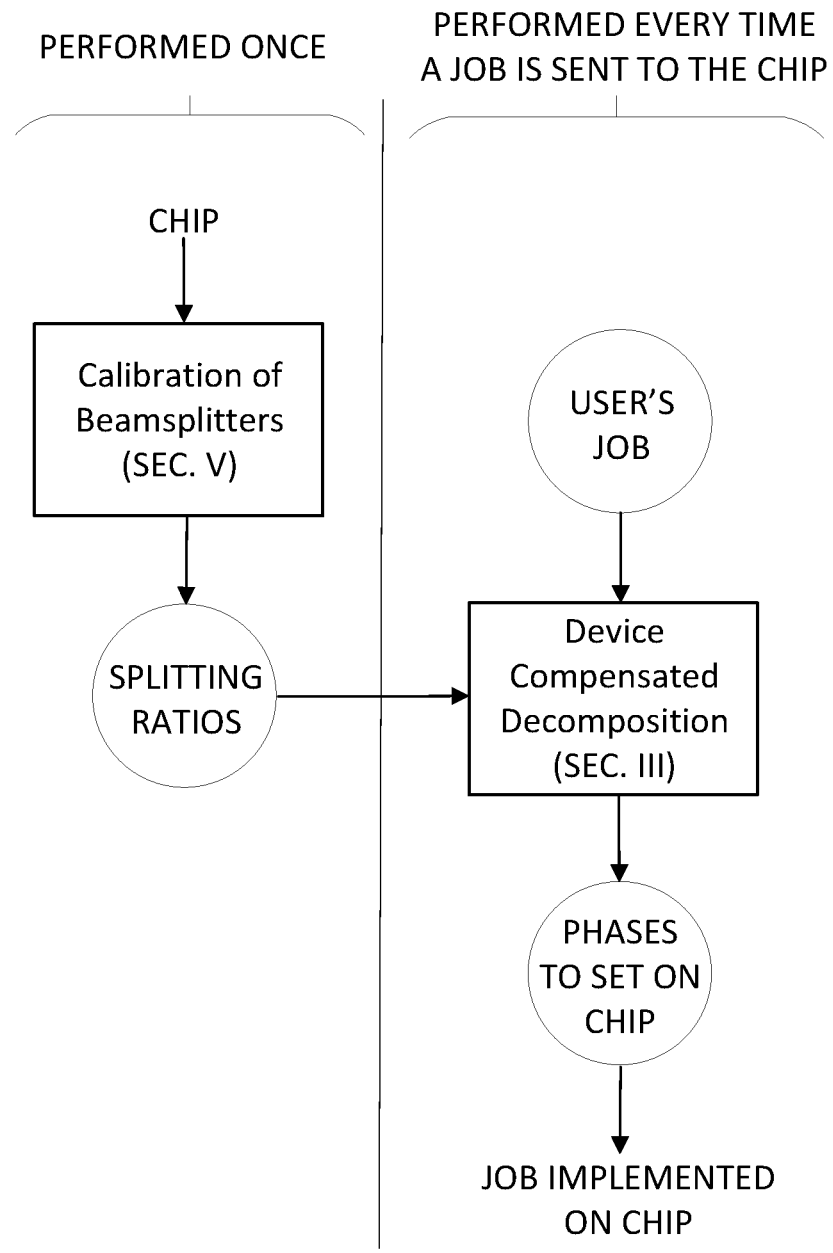
FIG. 1A is a flowchart showing data flows within a decomposition system, according to some embodiments.

According to one or more embodiments, a new decomposition (also referred to herein as "Trusplit," or "device compensated decomposition") accounts for imperfect splitting ratios on beamsplitters on a linear optical interferometer. Also described herein are example methods of identifying the imperfect splitting ratios (or other imperfections), referred to herein as "calibration" of the beamsplitters. The relationship between the device compensated decomposition and calibration is shown in FIG. 1A. As shown in FIG. 1A, for each given photonic chip including one or more beamsplitters, the beamsplitters are calibrated (discussed further below, in Section V) to identify one or more splitting ratios associated with that photonic chip. The calibration need only be performed once for each photonic chip. Subsequently, upon receipt of each job from a user (e.g., including one or more desired unitaries for implementation), a device compensated decomposition is performed (described further below, in Section III), taking into account the splitting ratios for the relevant photonic chip. The device compensated decomposition outputs (or is used to determine) the phases to be set on the chip, such that the user's job can be implemented on the chip.

The device compensated decomposition and calibration methods set forth herein have been extensively simulated and shown to work in a variety of circumstances. The device compensated decomposition, in particular, has been shown to lead to significant improvement in unitary fidelity, even when the splitting ratios are not precisely known and even when there is a spread in splitting ratios across the chip. The calibration method to identify these splitting ratios has also been shown to lead to accurate results when there is a spread in splitting ratios on the chip. Furthermore, both the device compensated decomposition and the calibration have been shown to improve with increasing chip size.

Figure 1B:
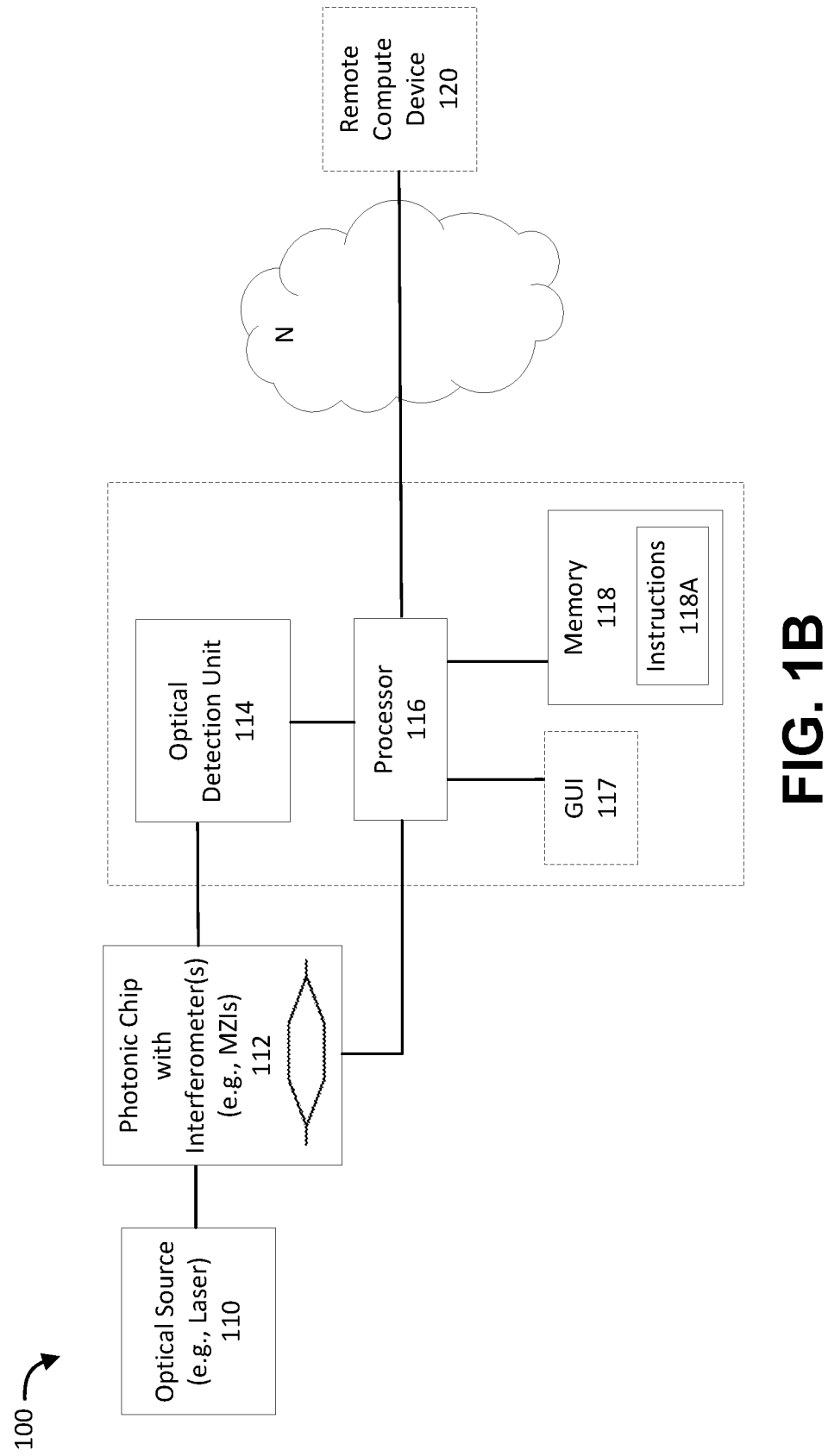
FIG. 1B is a diagram of a system for performing a decomposition method to implement a desired unitary while taking into account at least one imperfection, according to an embodiment.

FIG. 1B is a diagram of a system for performing a decomposition method to implement a desired unitary while taking into account at least one imperfection, according to an embodiment. As shown in FIG. 1B, the system 100 includes an optical source (e.g., one or more lasers, optical non-linearities, quantum dots, etc.) 110, optically coupled to a photonic chip 112, the photonic chip 112 including a linear optical interferometer, the linear optical interferometer including one or more interferometers (e.g., MZIs or networks for MZIs, where either could include imperfectly balanced MZIs), and an optical detection unit 114 (e.g., including one or more optical sensors/detectors). The optical detection unit 114 is optically coupled to an output of the photonic chip 112. The system 100 also includes a processor 116 operably coupled to a memory 118 and, optionally, a graphical user interface (GUI) 117. The processor 116 is also operably coupled to the photonic chip 112, such that the processor 116, during operation, can select phases based on a user request (e.g., specifying a desired unitary for implementation) and based on splitting ratios, and convert the selected phases into voltages that are applied to the photonic chip 112 to change the state of the MZIs on the one or more interferometers of the photonic chip 112. Two or more of the optical detection unit 114, the processor 116, the memory 118, and the optional GUI 117 can be co-located (e.g., within a common housing or geographic location). The system 100 also optionally includes a remote compute device 120A, which may be in communication with the processor 116 via a wireless or wired telecommunications network "N." The memory 118 can be a shared memory (e.g., a portion that is local to the processor 116 and a portion that is remote from the processor 116 and accessible via the network N), or the memory 118 can be fully local, or fully remote.

The memory 118 stores instructions 118A to cause the processor to execute actions. For example, in some embodiments, the memory 118 stores instructions 118A to cause the processor 116 to receive a representation of a linear optical interferometer and a representation of at least one splitting ratio associated with the linear optical interferometer. The memory 118 also stores instructions 118A to cause the processor 116 to identify a plurality of two-mode interferometers based on the representation of the linear optical interferometer and the representation of the at least one splitting ratio. The memory 118 also stores instructions 118A to cause the processor 116 to identify a plurality of phases based on the representation of the linear optical interferometer and the representation of the at least one splitting ratio. The memory 118 also stores instructions 118A to cause the processor 116 to send a signal at least one of: (1) to photonic chip 112 for implementation of the plurality of two-mode interferometers; or (2) to cause display, via a graphical user interface 117, of a representation of the plurality of two-mode interferometers and a representation of the plurality of phases, the plurality of two-mode interferometers and the plurality of phases configured to apply a unitary transformation to an input signal.

In some embodiments, the instructions 118A to cause the processor 116 to identify the plurality of two-mode interferometers include instructions 118A to perform a decomposition of the unitary transformation, for example based on a measured reflectivity value of a beamsplitter.

In some embodiments, the instructions 118A to cause the processor 116 to identify the plurality of two-mode interferometers include instructions 118A to (1) sequentially null elements of the unitary transformation to produce a diagonal matrix, and (2) invert the diagonal matrix.

In some embodiments, the linear optical interferometer includes at least one beamsplitter, and the memory also stored instructions 118A to cause the processor 116 to identify at least one imperfection associated with the linear optical interferometer by, for each beamsplitter from the at least one beamsplitter: (1) setting that beamsplitter to a cross state, (2) setting each remaining beamsplitter from the plurality of beamsplitters to a bar state, (3) causing light to be incident at an input port of that beamsplitter, and (4) measuring a light intensity at each output port of that beamsplitter; and (5) calculating the at least one imperfection based on the measured light intensities.

In some embodiments, the memory also stores instructions 118A to cause the processor 116 to identify a plurality of imperfections by calculating a plurality of expected light intensities for the linear optical interferometer based on a first plurality of estimated splitting ratios, and causing light (e.g., by communicating with a controller of the optical source 110) to be incident at an input port of the linear optical interferometer. A light intensity is measured at each output port of the linear optical interferometer, to produce a plurality of measured light intensities. The plurality of measured light intensities is compared to the plurality of expected light intensities, and additional pluralities of splitting ratios and associated expected light intensities are iteratively estimated, based on the comparison, to identify a plurality of splitting ratios having associated expected light intensities that are closest to the measured light intensities. The plurality of imperfections includes the plurality of splitting ratios having associated expected light intensities that are closest to the measured light intensities.

In some embodiments, the memory also stores instructions 118A to cause the processor 116 to receive a signal representing a user selection of the unitary transformation.

II. PROBLEM STATEMENT

A. Decomposition of Linear Optics Unitary Matrices

Photonic chips can be designed to accommodate a predetermined number of optical modes, which are self-consistent electric field distributions in waveguides, optical resonators, or free space. A linear optical transformation implemented on an N-mode chip can be described by a unitary matrix "U," which describes the transformation between bosonic operators as follows:

$$a'_i = \sum_{j=1}^{N} U_{ij} a_j. \tag{1}$$

To physically implement the linear optical transformation on a linear optical device, the unitary U can be decomposed into smaller, two-mode unitary matrices that can be directly implemented using optical elements on the chip (e.g., including beamsplitters and/or phaseshifters). These two-mode unitary matrices can then be implemented using tunable Mach-Zehnder interferometers (MZIs), which include static balanced (i.e., with 50:50 splitting ratios) beamsplitters and tunable phase shifters. An example representation of the transformation implemented by the balanced beamsplitters on the chip is as follows:

$$B_{bal} = \frac{1}{\sqrt{2}} \begin{pmatrix} 1 & i \\ i & 1 \end{pmatrix}. \tag{2}$$

A phase shifter can implement the transformation:

$$R(\phi) = \begin{pmatrix} e^{i\phi} & 0 \\ 0 & 1 \end{pmatrix} \tag{3}$$

for any tunable $\phi$. Sandwiching a phase shifter $R(\phi i)$ in between two balanced beamsplitters leads to the tunable beamsplitter of the form:

$$B(\phi_i) = ie^{i\phi_i/2} \begin{pmatrix} \sin\phi_i/2 & \cos\phi_i/2 \\ \cos\phi_i/2 & -\sin\phi_i/2 \end{pmatrix}, \tag{4}$$

and by implementing an additional external phase ($R(\phi_e)$), the Mach-Zehnder matrix $\mathcal{M}$ can be obtained, given by:

$$M(\phi_i, \phi_e) = B_{bal} R(\phi_i) B_{bal} R(\phi_e) \tag{5}$$

$$= ie^{i\phi_i/2} \begin{pmatrix} e^{i\phi_e}\sin\phi_i/2 & \cos\phi_i/2 \\ e^{i\phi_e}\cos\phi_i/2 & -\sin\phi_i/2 \end{pmatrix}. \tag{6}$$

By tuning $\phi_i$ and $\phi_e$, any U(2) matrix can be implemented. The foregoing notation, however, is not the only notation used to represent this concept in the literature. For example, the T-matrices considered in W. R. Clements, et al., "Optimal design for universal multiport interferometers," Optica 3, 1460-1465 (2016), arXiv:1603.08788 (the entire contents of which are incorporated herein by reference in their entirety) are given by:

$$T_1(\phi_i, \phi_e) = \begin{pmatrix} e^{i\phi_e}\cos\phi_i & -\sin\phi_i \\ e^{i\phi_e}\sin\phi_i & \cos\phi_i \end{pmatrix}, \tag{7}$$

and those considered in M. Reck, et al., "Experimental realization of any discrete unitary operator," Phys. Rev. Lett. 73, 58-61 (1994) (the entire contents of which are incorporated herein by reference in their entirety) have the form:

$$T_2(\phi_i, \phi_e) = \begin{pmatrix} e^{i\phi_e}\sin\phi_i & e^{i\phi_e}\cos\phi_i \\ \cos\phi_i & -\sin\phi_i \end{pmatrix}. \tag{8}$$

Equations (7) and (8) differ from equation (6) in their definition of the angles and convention of phases. The convention of equation (6) is specifically adopted in the calculations set forth herein because it represents hardware realizations of Mach-Zehnder interferometers on a chip.

Known decomposition algorithms such as those in Clements and Reck decompose an N-mode unitary into $M_{mn}(\phi_i,\phi_e)$ matrices and its inverse $M_{mn}^{-1}(\phi_i,\phi_e)$, which are N×N identity matrices whose mth row and nth column are set to the elements of the matrix M (Eq. (6)) and its inverse $M^{-1}$, respectively.

Known decomposition algorithms typically rely on sequentially nulling elements of the unitary matrix U by multiplying the unitary matrix U by $M_{mn}(\phi_i,\phi_e)$ or $M_{mn}^{-1}(\phi_i,\phi_e)$ and choosing values of $\phi_i$ and $\phi_e$ such that the elements are nulled. This nulling is carried out till only a diagonal matrix remains. Inverting the relation yields the decomposition of the matrix U. In mathematical terms, if the correct sequence of matrices is selected to null elements of U until a diagonal matrix D is obtained:

$$M_{m_1 n_1} M_{m_2 n_2} \ldots U M_{m_3 n_3}^{-1} M_{m_4 n_4}^{-1} \ldots = D \tag{9}$$

then the decomposition of U can be obtained as:

$$U = \ldots M_{m_2 n_2}^{-1} M_{m_1 n_1}^{-1} D \ldots M_{m_4 n_4} M_{m_3 n_3}. \tag{10}$$

Since D is a diagonal matrix of phase elements, matrices D' and $M'_{mn}$ can be found such that:

$$M_{mn}^{-1} D = D' M'_{mn}. \tag{11}$$

By applying this relation repeatedly, U can be decomposed into only $M_{mn}$ matrices followed by phases on each mode represented by D, bringing Eq. (10) into the form:

$$U = D M_{m_1 n_1} M_{m_2 n_2} \tag{12}$$

The phases $\phi_i$ and $\phi_e$s that comprise the $M_{mn}$ matrices are then set on the interferometer to implement the desired unitary U. In other words, the values of the phases are sent to software, which in turn causes a modification to the voltages that are input to the chip. Overall voltages are then used to select a desired transformation that, in turn, acts on the input light.

Different sequences of initial nulling orders (i.e., before the phases are moved to the left) lead to different physical geometries (i.e., the physical arrangement of the optical elements on the chip) of the decomposed smaller unitaries. For example, nulling can be performed only using $M_{mn}(\phi_i, \phi_e)$ matrices multiplied to the left, which results in a circuit that is triangular in physical structure, as proposed by Reck. Another possible decomposition, where initial nulling is performed by multiplying $M_{mn}(\phi_i,\phi_e)$ matrices to the left and $M_{mn}^{-1}(\phi_i,\phi_e)$ matrices to the right, leads to the rectangular circuit structure of Clements (discussed further below, in the section titled "Clements Rectangular Architecture").

The foregoing decompositions assume that it is possible to perfectly implement the transformation $\mathcal{M}$ using MZIs. This may not be possible, however, for example when the beamsplitters on the chip are not perfectly balanced (i.e., when Eq. (2) does not hold). In such instances, the set of phases obtained from the decomposition in Eq. (12) will implement a unitary on the chip that is different from what is expected. Accounting for such imperfections in the chip (e.g., the imbalanced beamsplitters) during the decomposition itself can lead to more accurate, and more predictable, unitaries implemented on the chip.

III. DEVICE COMPENSATED DECOMPOSITION

Consider a more general decomposition in which imbalanced beamsplitters are accounted for by decomposing an N×N unitary U into imperfect 2×2 MZIs. To realistically model these imperfect interferometers $\mathcal{M}$, the effective transformation implemented by the imperfect MZIs can be considered. Non-balanced beamsplitters can be modelled as:

$$B(\theta) = \begin{pmatrix} \cos\theta & i\sin\theta \\ i\sin\theta & \cos\theta \end{pmatrix} \tag{13}$$

whose reflectivity is $\cos^2\theta$. This reduces to Eq. (2) when $\theta=\pi/4$. In principle, there could also be additional phases such that the resulting beamsplitter reduces to Eq. (2) in the limit, but these extra phases can be accounted for during calibration.

The phase shifters are as represented in Eq. (3). Multiplying them together, the Mach-Zehnder unit $\mathcal{M}^{(\theta)}$ that is actually implemented when the beamsplitters are imperfect is obtained, as follows:

$$\mathcal{M}^{(\theta)} = B(\theta)R(\phi_i)B(\theta)R(\phi_e) \tag{14}$$

$$= \begin{pmatrix} e^{i\phi_e}(e^{i\phi_i}\cos^2\theta - \sin^2\theta) & ie^{i\frac{\phi_i}{2}}\cos\left(\frac{\phi_i}{2}\right)\sin 2\theta \\ ie^{i(\phi_e+\frac{\phi_i}{2})}\cos\left(\frac{\phi_i}{2}\right)\sin 2\theta & -e^{i\phi_i}\sin^2\theta + \cos^2\theta \end{pmatrix} \tag{15}$$

Note that $$\mathcal{M}^{(\frac{\pi}{4})} = \mathcal{M}.$$

Another approach to account for $\theta \neq \pi/4$ is to adjust the phases from their set values ($\phi_i$ and $\phi_e$) such that the desired MZI is obtained, as in Eq. (6). Comparing Eqs. (6) and (15), however, reveals that no such solution can be found for general values of $\phi_i$ and $\phi_e$. If the overall phase is ignored, this would be possible, for example if considering a two spatial mode unitary.

Since the foregoing solution may not work for an arbitrary unitary, the decomposition procedure may be modified so that the unitary is decomposed into MZ matrices in Eq. (15) instead of Eq. (6), and the $\phi_i$s and $\phi_e$s of each MZI for a given $\theta$ for that MZI can be found. Such an approach is similar to the Clements decomposition and can be performed following the steps of Eqs. (9) to (12).

Note that it may not always be possible to find a value of $\phi_i$ for every MZI for a perfect decomposition. In such cases, the value of these phases can be set to the closest possible value(s). Although setting each MZI to the closest possible settings may not produce the closest full unitary matrix, simulations indicate that it works well in practice. The equations in the decomposition and the differences relative to Clements are detailed in Table I below. The decomposition also works when each MZI has a different splitting ratio and, therefore, a different value of $\theta$.

IV. ADVANTAGES AND ROBUSTNESS OF DEVICE COMPENSATED DECOMPOSITION

Embodiments of the device compensated decomposition offer a variety of advantages over the Clements decomposition (in which the beamsplitters are assumed to be perfectly balanced). To demonstrate the difference in performance, a measure of distance can be used to compare a unitary that one expects to implement with the unitary that is actually implemented using imperfect hardware. Consider a unitary that is to be implemented, "U." U can be decomposed into phases using a reflectivity that the beamsplitters are assumed to have. The assumed reflectivity is equal to 0.5 in the Clements decomposition, and is the measured value ($\cos^2\theta$) when using the device compensated decomposition. The unitary that is actually implemented on the chip is $U_{imp}$, which is reconstructed back from the phases obtained using the actual reflectivities on the chip.

In mathematical terms, $U_{imp}$ is obtained by first decomposing U into a set of phases $\{\phi_{i,n}, \phi_{e,n}\}$, where n is the number of the MZI and ranges from 1 to N (N−1)/2.

The decomposition is performed analogous to Eq. (12), but using the generalized MZ matrices $\mathcal{M}^{(\theta)}$:

$$U=DM_{m_1 n_1}^{(\theta)}M_{m_2 n_2}^{(\theta)} \tag{16}$$

When the beamsplitters are assumed to be balanced, $\theta=\pi/4$. Otherwise, the value of $\theta$ is found through experimental measurements on a test chip. $U_{imp}$ is constructed from the phases $\{\phi_{i,n},\phi_{e,n}\}$ by constructing $\mathcal{M}^{(\theta)}$ matrices from these angles, where $\phi$ corresponds to the actual splitting ratio on the chip, and multiplying them together:

$$U_{imp}=M_{m_1 n_1}^{(\theta)}M_{m_2 n_2}^{(\theta)} \tag{17}$$

Figure 2:
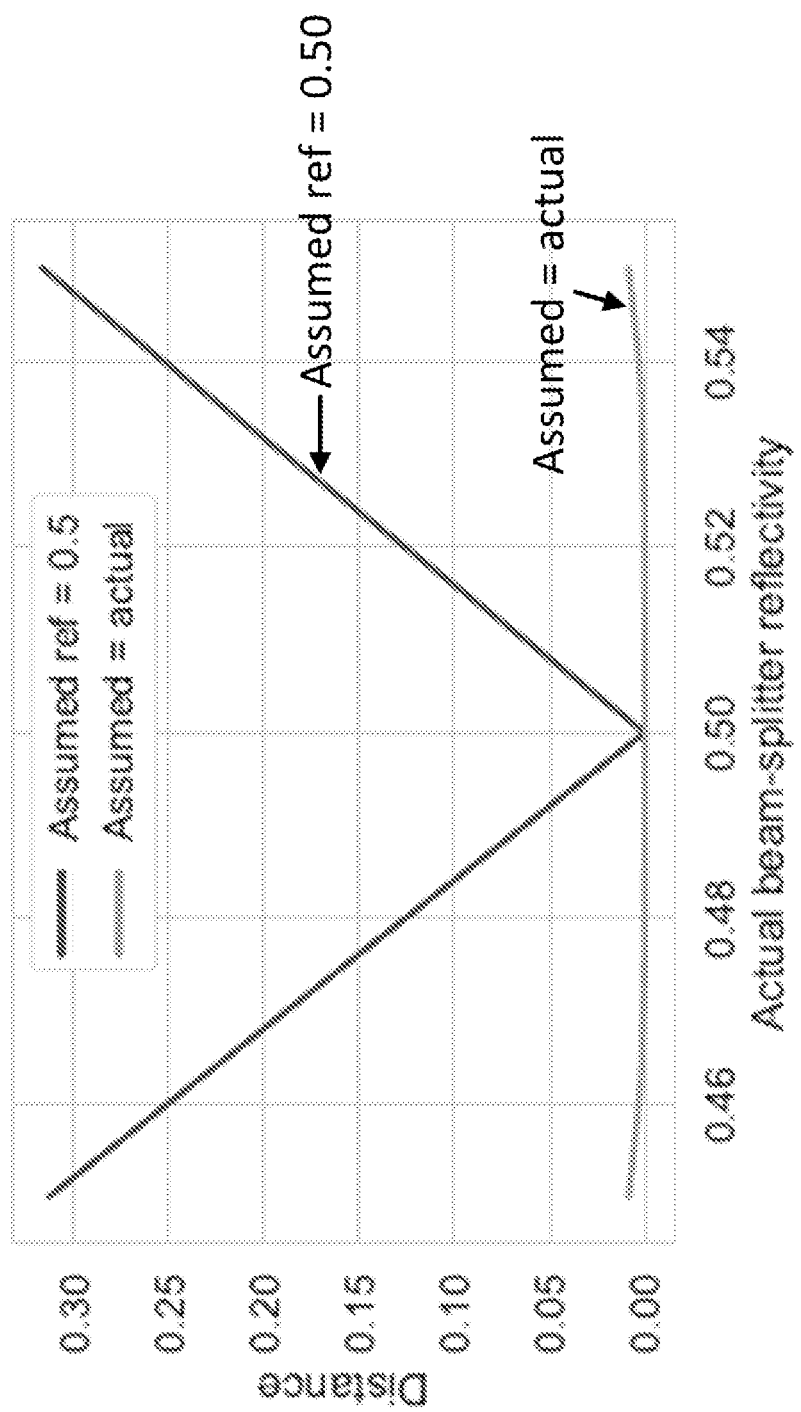
FIG. 2 is a plot comparing the average distance between expected and implemented 6-mode unitaries, as a function of actual beamsplitters reflectivities, for a Clements decomposition and a decomposition, according to some embodiments.

FIG. 2 (discussed further below) shows the average distance between an expected unitary and an implemented 6-mode unitary, averaged over 50 Haar-random unitaries, as a function of actual beamsplitter reflectivities for the Clements decomposition (line labelled "Assumed ref=0.50") and the device compensated decomposition (line labelled "Assumed=actual"). As can be seen in FIG. 2, using the actual reflectivity in the decomposition can reduce the distance by two orders of magnitude.

To compare the Clements and device compensated decomposition methods, consider the distance "d," defined as:

$$d=\|UU_{imp}^{\dagger}-\mathbb{I}\|_F, \tag{18}$$

where $\|\ \|_F$ is the Frobenius norm. This distance d between the expected unitary U and the implemented unitary $U_{imp}$ is averaged over many Haar-random unitaries and the averaged distance $\bar{d}$ is plotted in FIGS. 2 through 5, comparing the Clements and device compensated decompositions in various situations.

In FIG. 2, the average distance is plotted as a function of the actual reflectivity of the beamsplitters for both decompositions—one assuming a fixed reflectivity and one where the actual reflectivity is used, for a 6-mode unitary. By knowing precisely, and using, the actual reflectivity can drastically reduce the distance as compared with the assumption that the beamsplitters are perfectly balanced. Even if the reflectivities of the beamsplitters are not precisely known, it can be seen in FIG. 3B that, on an average, it is desirable to use a value closer to the actual reflectivity (as opposed to assuming balanced beamsplitters) since the distance gets larger the further away the assumed reflectivity is from the actual reflectivity.

Figure 3A:
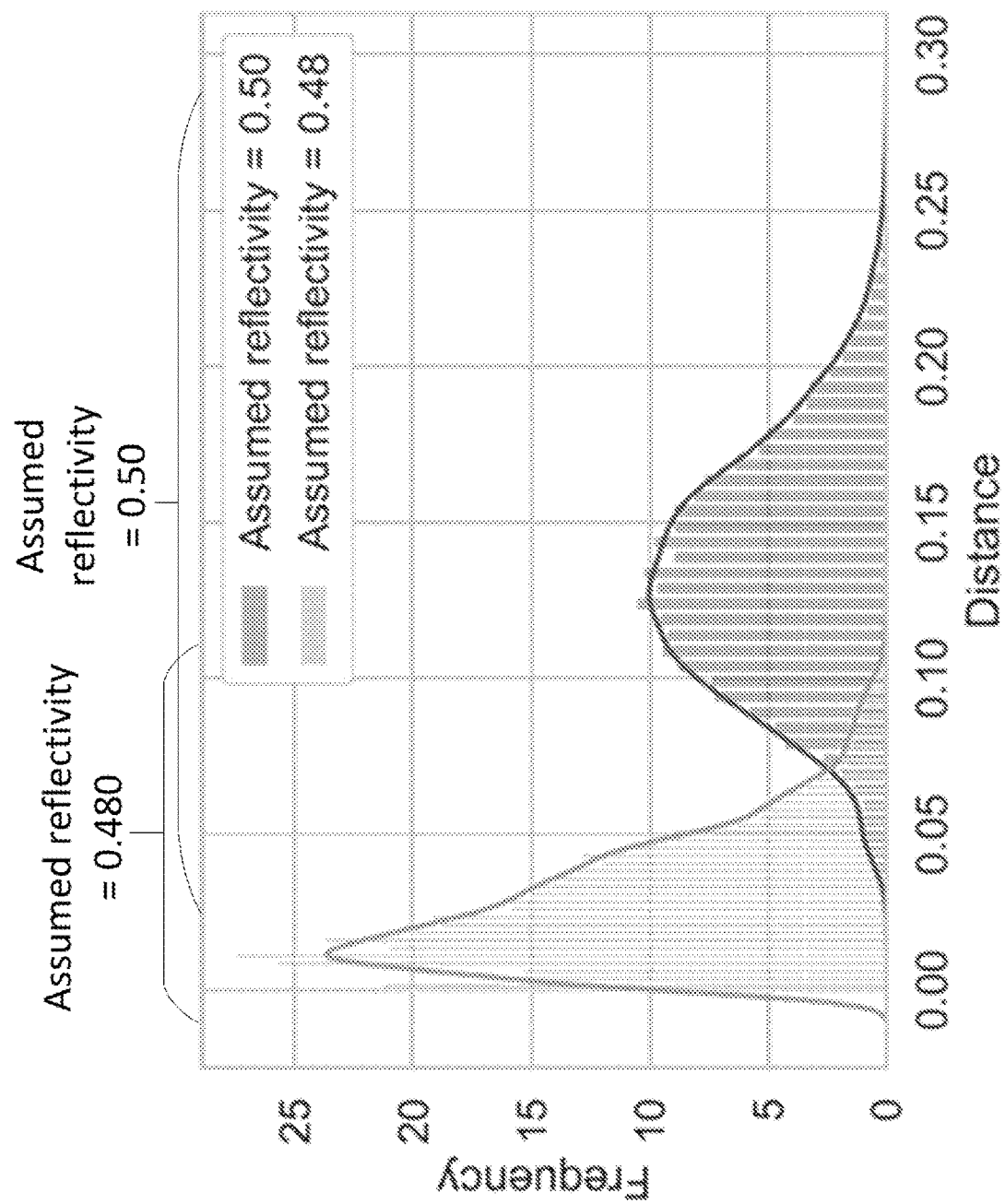
FIG. 3A is a plot showing distributions of distances between expected and implemented unitaries, for a Clements decomposition and a decomposition, according to some embodiments.
Figure 3B:
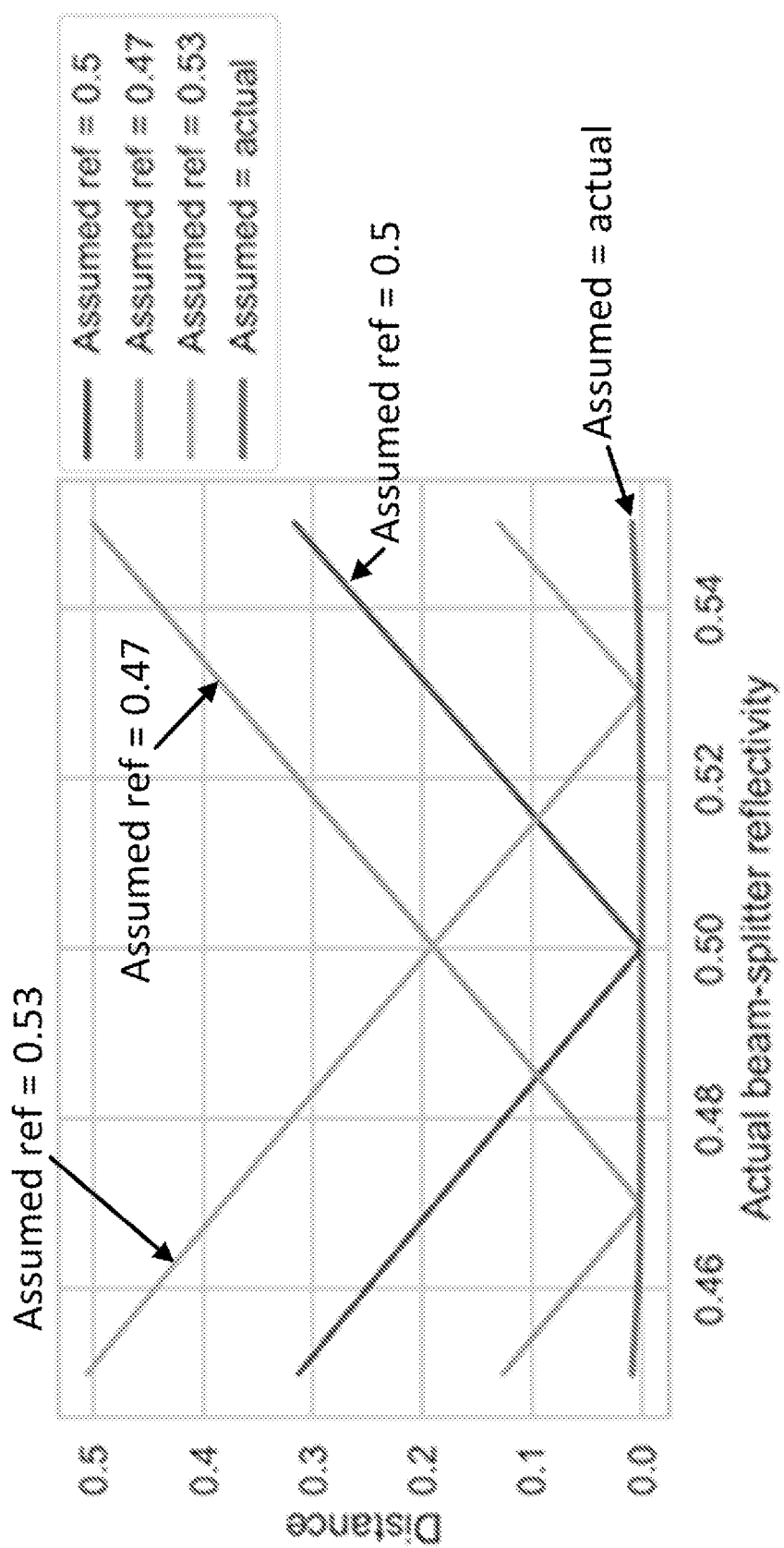
FIG. 3B is a plot similar to the plot of FIG. 2, comparing the average distance between expected and implemented unitaries, and including additional assumed reflectivities, according to some embodiments.

To check the robustness of the device compensated decomposition to imprecision in measuring the reflectivity of beamsplitters on the chip, 300 values of reflectivities were drawn from a Gaussian distribution having a mean of 0.48 and a standard deviation of 0.005. The distance for each value of reflectivity was calculated for 50 Haar-random unitaries, and the distribution is plotted in FIG. 3A. As can be seen in FIG. 3A, even if the actual reflectivity is not precisely known, assuming the mean of the distribution is preferable to assuming that the beamsplitters are perfectly balanced, in most cases. Moreover, device compensated decomposition methods set forth herein can be robust to (or effective despite) imprecision in measuring the reflectivity value.

standard deviation of 0.005 and 50 Haar-random unitaries, and the distribution of distances was plotted, assuming reflectivities of 0.5 (e.g., Clements) and 0.48 (device compensated). From FIG. 5, it can be seen that the device compensated decomposition results in a tighter and more predictable unitary, and that even assuming a fixed reflectivity, but having a value that is closer to the peak of the distribution of the reflectivities is consistently better than assuming balanced beamsplitters. As such, by determining the individual splitting ratios of each MZI, those individual values can be used to achieve significantly improved, and even nearly perfect, fidelity.

TABLE I

Differences between the Clements and Device Compensated decompositions

| | Clements et al. | Device Compensated decomposition |
|---|---|---|
| Nulling matrices | $ie^{i\frac{\phi_i}{2}}\begin{pmatrix} e^{i\phi_e}\sin\left(\frac{\phi_i}{2}\right) & \cos\left(\frac{\phi_i}{2}\right) \\ e^{i\phi_e}\cos\left(\frac{\phi_i}{2}\right) & -\sin\left(\frac{\phi_i}{2}\right) \end{pmatrix}$ | $\begin{pmatrix} e^{i\phi_e}(e^{i\phi_i}\cos^2\theta - \sin^2\theta) & ie^{i\frac{\phi_i}{2}}\cos\left(\frac{\phi_i}{2}\right)\sin2\theta \\ ie^{i(\phi_e+\frac{\phi_i}{2})}\cos\left(\frac{\phi_i}{2}\right)\sin2\theta & -e^{i\phi_i}\sin^2\theta + \cos^2\theta \end{pmatrix}$ |
| Nulling equations (with $\mathcal{M}$) | $\phi_i = 2\tan^{-1}\left\|\frac{U_{n-1,m}}{U_{n,m}}\right\|$ $\phi_e = -\arg\left(\frac{U_{n-1,m}}{U_{n,m}}\right)$ | $s := \frac{1}{\sin2\theta}\cos\left(\tan^{-1}\left\|\frac{U_{n-1,m}}{U_{n,m}}\right\|\right),$ $\phi_i = \begin{cases} 2\cos^{-1}s & \text{if } -1 < s < 1 \\ 2\pi & \text{if } s < -1 \\ 0 & \text{if } s > 1 \end{cases}$ $\phi_e = -\arg\left(\frac{U_{n-1,m}}{U_{n,m}}\right) + \frac{\pi}{2} - \frac{\phi_i}{2} + \tan^{-1}\left(\frac{-\sin^2\theta\sin\phi_i}{\cos^2\theta - \sin^2\theta\cos\phi_i}\right)$ |
| Nulling equations (with $\mathcal{M}^{-1}$) | $\phi_i = 2\tan^{-1}\left\|\frac{U_{n,m+1}}{U_{n,m}}\right\|$ $\phi_e = -\arg\left(\frac{U_{n,m+1}}{U_{n,m}}\right) + \pi$ | $s := \frac{1}{\sin2\theta}\cos\left(\tan^{-1}\left\|\frac{U_{n,m+1}}{U_{n,m}}\right\|\right),$ $\phi_i = \begin{cases} 2\cos^{-1}s & \text{if } -1 < s < 1 \\ 2\pi & \text{if } s < -1 \\ 0 & \text{if } s > 1 \end{cases}$ $\phi_e = -\arg\left(\frac{U_{n,m+1}}{U_{n,m}}\right) - \frac{\pi}{2} + \frac{\phi_i}{2} + \tan^{-1}\left(\frac{-\cos^2\theta\sin\phi_i}{\sin^2\theta - \cos^2\theta\cos\phi_i}\right)$ |

Figure 4:
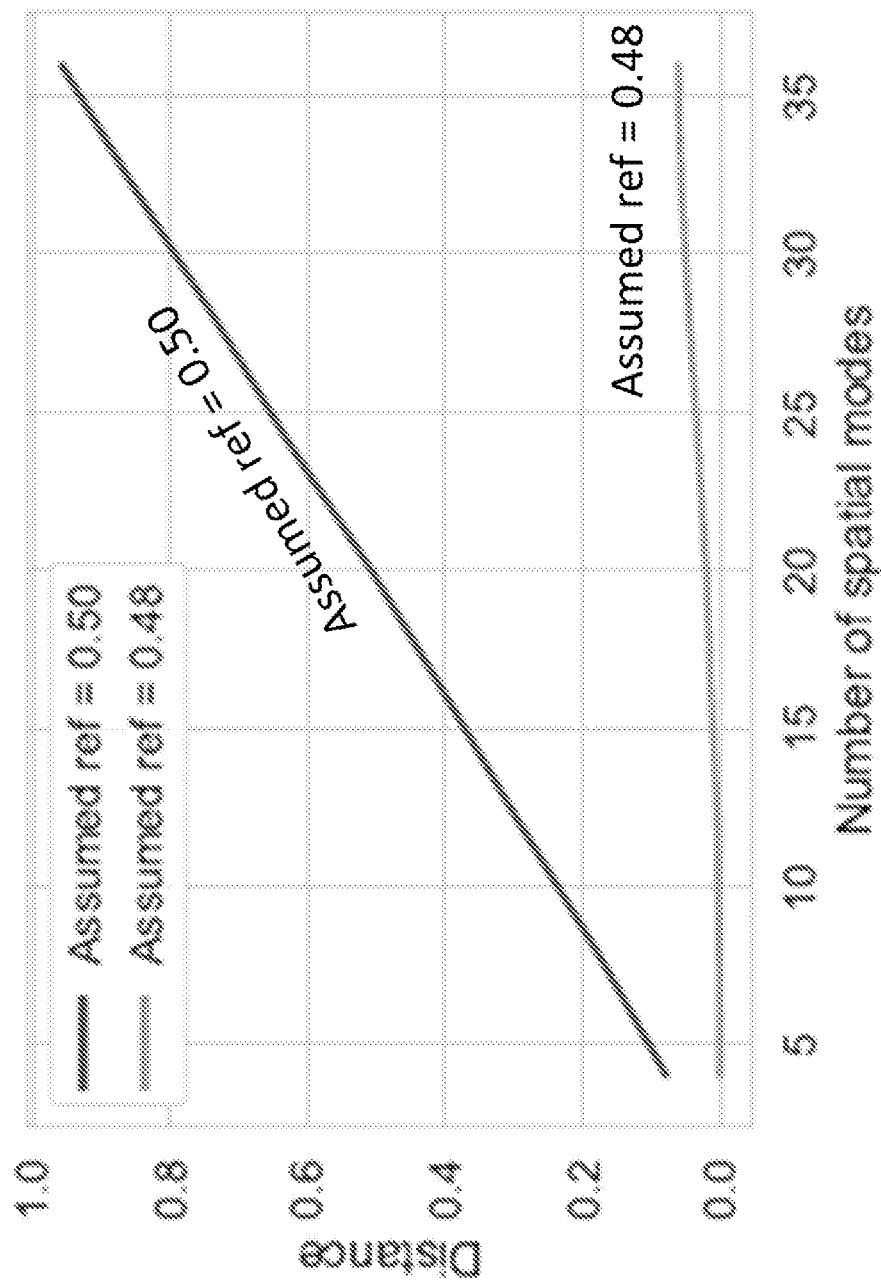
FIG. 4 is a plot comparing the distance between expected and implemented unitaries, as a function of the size of the unitary, for a rectangular decomposition and a decomposition, according to some embodiments.
Figure 5:
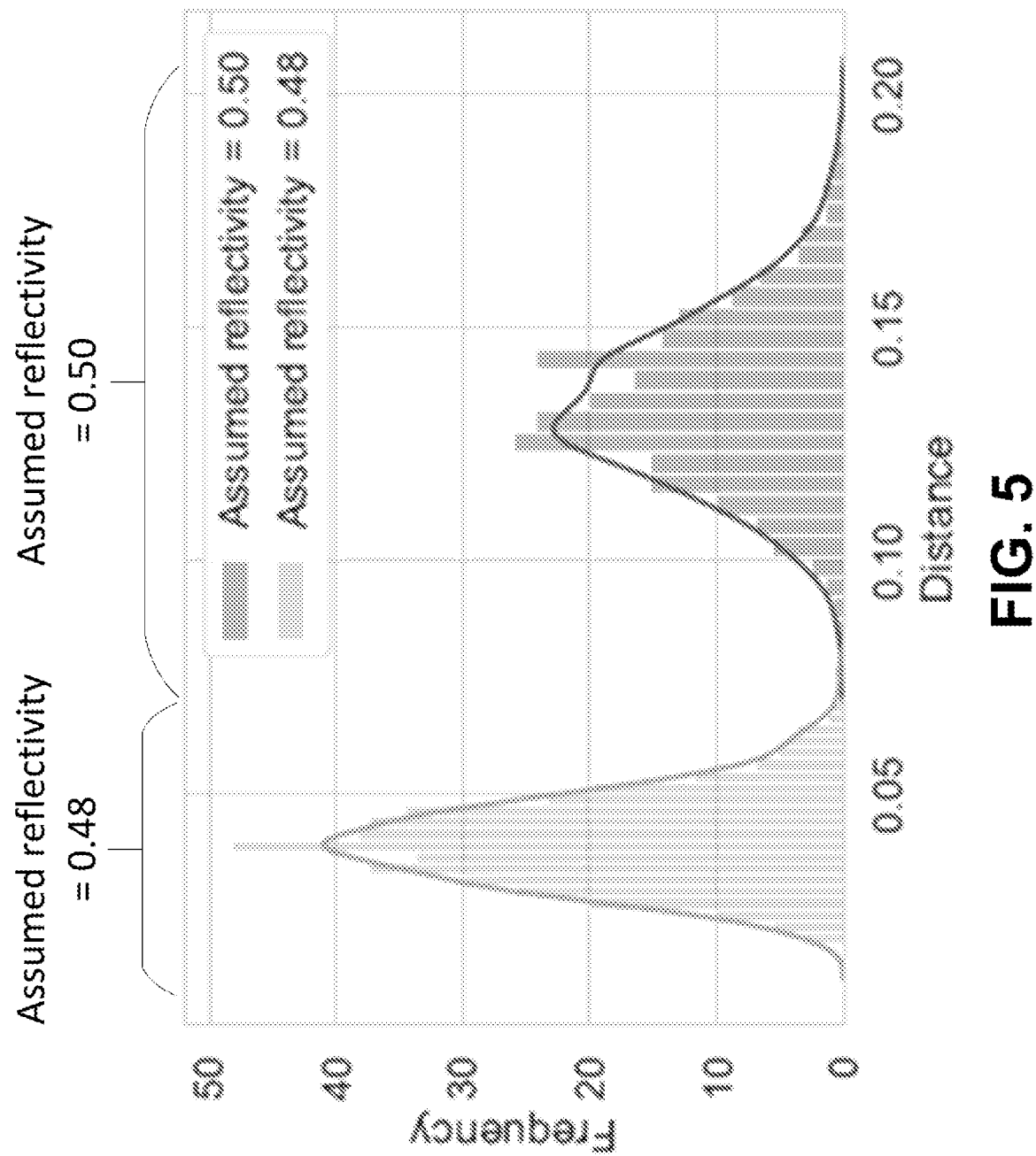
FIG. 5 is a plot showing distributions of distances between expected and implemented unitaries, for 20 sets of reflectivities, showing the robustness of decomposition to non-identical beamsplitters, according to some embodiments.

The size-dependence of the accuracy of the Clements and device compensated decompositions is illustrated in FIG. 4, where the average distance between the expected unitary and the implemented unitary is plotted for an interferometer with beamsplitters having 48:52 splitting ratios. All beamsplitters in the interferometer considered in FIG. 4 have a reflectivity of 0.48. The two decompositions, one (Clements) assuming that the reflectivities are all 0.5 and another (device compensated) assuming the true reflectivity of 0.48, are compared and while the device compensated decomposition leads to larger distances as the size increases, it still provides an order of magnitude improvement over alternative methods that do not take imperfections into account, in which case the quality of the implemented unitary can be quite low.

The following describes an assessment of the robustness of the device compensated decomposition when the beamsplitters on the interferometer are not identical. The splitting ratios were all assumed to be different, but drawn from a Gaussian distribution. 20 sets of reflectivities were drawn from a Gaussian distribution centered around 0.48 with a

V. CALIBRATION: FINDING SPLITTING RATIOS

The following details two example methods for identifying the splitting ratios on a chip. Both methods can be implemented using only classical light (e.g., instead of squeezed light), thereby making them less prone to noise. The first method allows finding the splitting ratios of each of the beamsplitters but may be prone to errors resulting from other imperfections on the chip. The second method is more robust to the other imperfections on the chip but returns only the mean of all the splitting ratios rather than the individual splitting ratios themselves. Note that, as demonstrated in FIG. 5, even the knowledge of the mean can be useful in improving fidelities.

A. Identifying Splitting Ratios for Each MZI

In some embodiments, a method for identifying the splitting ratios of each MZI on a chip is based on the observation that, in the presence of imperfect splitting ratios, the "bar"

state of an MZI (i.e., the state in which all light transmits straight through) can be implemented perfectly, whereas the "cross" state (i.e., the state in which all light from one port completely crosses over to another port) cannot. From Eq. (15), it can be inferred that the bar state is achieved when $\phi_i=\pi$, and the cross state is achieved when $\phi_i=0$.

An example procedure for identifying the splitting ratios of a particular MZI on a chip is as follows: the splitting ratio of a particular MZI can be found by setting that MZI to the cross state and every other MZI to the bar state. Light is incident at one of the input ports of the MZI in the cross state, and the intensity at both of its associated output ports is measured. Using Eq. (15), it can be calculated that the intensity at the two output ports is proportional to $\cos^2 2\theta$ and $\sin^2 2\theta$, where $\theta$ is the splitting angle of the beamsplitters. In the case of perfect splitting ratios, $$\theta = \frac{\pi}{4},$$

in which case the intensities at the output ports would be 0 and 1. By measuring the intensities and calculating their ratio $\cot^2 2\theta$, the value of $\theta$ can be inferred for that MZI. The foregoing procedure can be repeated for each MZI, to identify all of the splitting ratios.

In some embodiments, a slightly different (and, in some implementations, faster) method is employed, in that, in addition to finding the splitting ratios by setting each beamsplitter to the cross state as described above, multiple (e.g., a few) beamsplitters on the interferometer can be sampled to obtain a rough estimate of the average splitting ratio, for example for applications for which a detailed calibration method is too costly (e.g., in terms of time, computational resources, or cost). An example of such a method is as follows:

1. Set the beamplitters on one diagonal of the interferometer to the cross state and the rest of the beamplitters to the bar state, i.e., such that most of the light incident on the first input port exits the last output port.
2. Measure the intensities from all of the output ports to calculate the splitting ratios.
3. Repeat steps 1 and 2 for the other diagonal, i.e., such that most of the light incident on the last input port exits the first output port. Take the average of the splitting ratios obtained from each diagonal.

In some instances, the foregoing methods may not yield the splitting ratios to a desired precision in the presence of other imperfections, such as imperfect calibration, for example because the methods may rely on the ability to implement the bar state perfectly in each MZI in the chip, which may not always be feasible. As such, in the following section, another method is presented, for identifying the mean of the splitting ratio distribution to a high degree of precision, using a gradient descent algorithm. Such a method can be especially beneficial if the variance in splitting ratios across the chip is low.

B. Finding a "Best" Splitting Ratio of All MZIs Together

In some embodiments, an iterative method for identifying a "best" splitting ratio for all MZIs on a chip, collectively, includes iteratively guessing the splitting ratio. The iterative method can include the following steps:

1) A specific fixed unitary operator is implemented on the interferometer/chip, with light incident at only one fixed input port, and the intensities at all output ports are measured. The choice of this unitary operator and input port is described below.
2) The device compensated decomposition is applied using a guessed splitting ratio to implement the unitary operator and calculate the norm of the vector of the difference between expected and observed intensities.
3) Iterative guesses as to better values of splitting ratios are made until a minimum difference is identified. The iterative guessing can be performed using an optimization method, such as Brent optimization or any other suitable optimization method.

Figure 6:
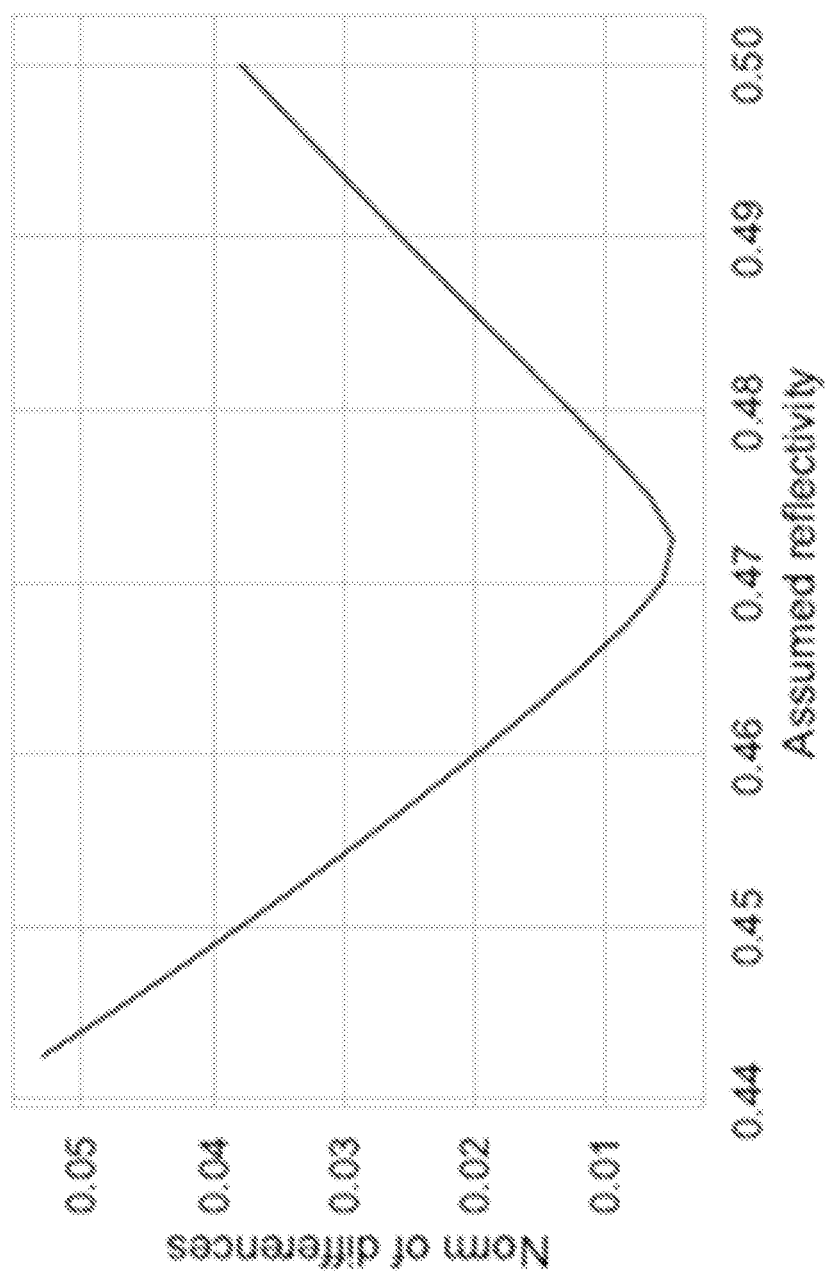
FIG. 6 is a plot of the norm of the differences in intensity between expected and observed intensities in a 12 mode unitary, according to some embodiments.

The choice of the unitary operator that gives the largest value of this difference is one such that each MZI is set to a value close to a cross state. Such an operator is chosen so that the gradient is steepest and the gradient descent algorithm can yield more accurate values of the mean. The motivation for this choice comes from considering Eq. (15), from which one can calculate the norm of the vector of intensity differences between an imperfect MZI with angle $\theta$ and a perfect 50-50 MZI to be equal to $\frac{1}{8}(\cos \phi_i+1)^2(\cos 4\theta+1)^2$. It can be seen that this is maximum when $\phi_i=0$, or the MZI is set to a cross state. A perfectly "crossed" MZI (i.e., where all light from one port completely crosses over to another port), however, cannot be implemented when the beamsplitters have imperfect splitting ratios. As such, the largest difference in intensities when using actual versus assumed reflectivities occurs at different values of $\phi_i$, though close to $\phi_i=0$. The light is incident at only one input port, and the choice of the input port can be made by simulating multiple random input ports and selecting the one with the steepest gradient of intensity (see discussion of FIG. 6 below).

A simulation of the foregoing method was performed, and the results were very good. To generate the plot FIG. 6, the norm of the vector of the difference between the expected and observed intensities in a 12-mode unitary, for different assumed reflectivities, were calculated, and it was confirmed that when the splitting ratios across the chip are normally distributed, a minimum (~0.47) occurs in this norm that is close to the mean of the normal distribution. Using Brent optimization (evaluating the function at only 9 points), the value of this minimum was found to be 0.472, which is close to the actual minimum. In some implementations, such a gradient descent algorithm need only perform the decomposition a few times to arrive at the position of the minimum.

Figure 7:
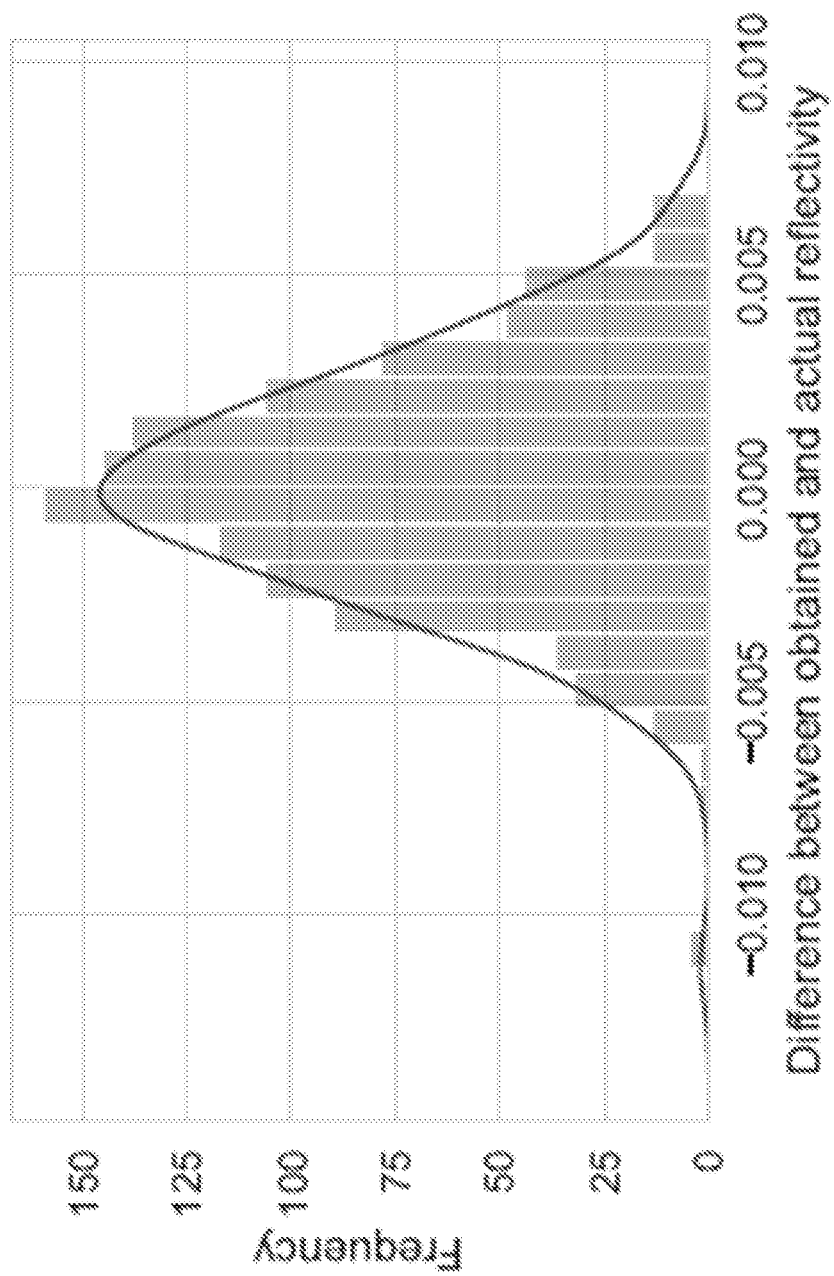
FIG. 7 is a plot showing the distribution of the differences between the actual mean of the reflectivities on a chip and the value obtained from an optimization procedure, according to some embodiments.
Figure 8:
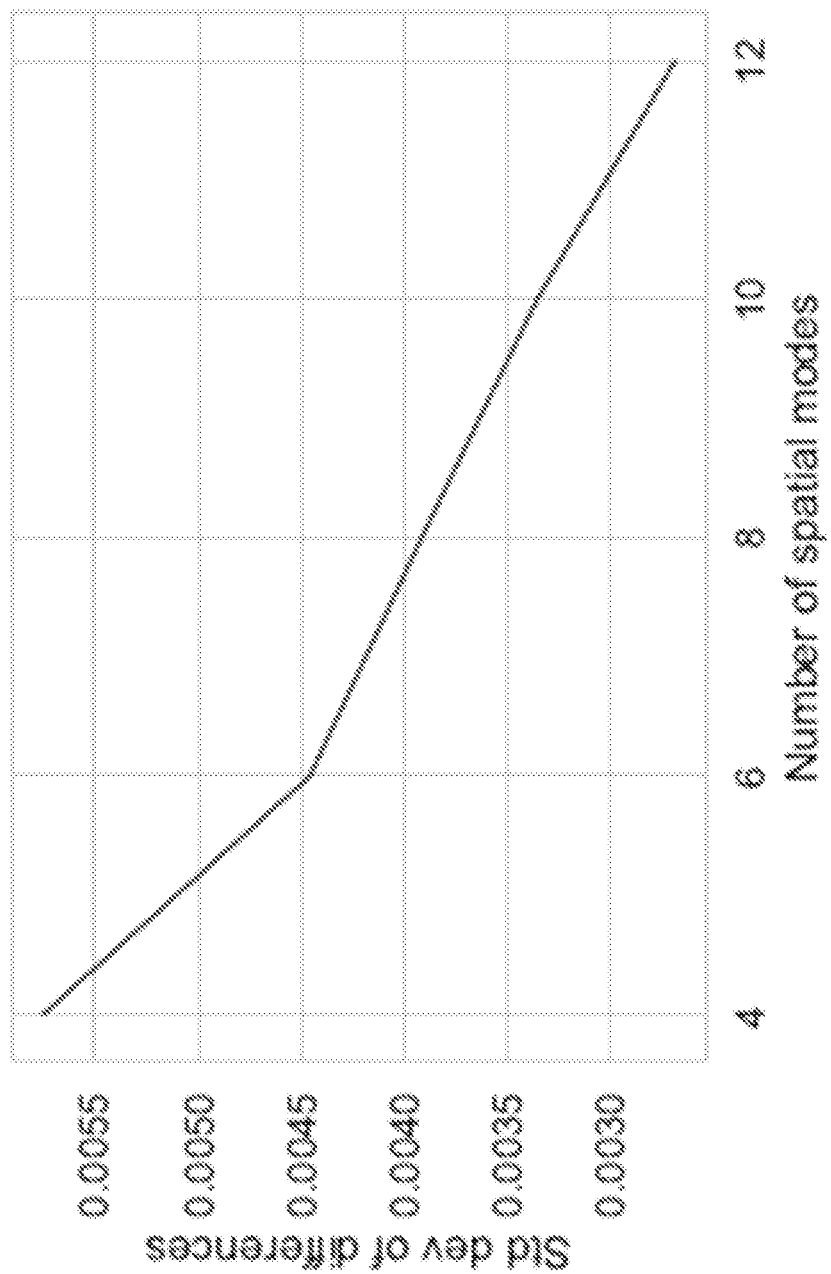
FIG. 8 is a plot showing the accuracy of a decomposition method, as a function of the number of spatial modes in an interferometer, showing that reliability increases as system size increases, according to some embodiments.

To analyze the accuracy of the foregoing method in obtaining the correct splitting ratio, the distribution of the difference between the mean splitting ratio obtained from the optimization procedure and the actual mean splitting ratio was plotted, as shown in FIG. 7. As shown in FIG. 7, the method set forth herein yields the correct value of the mean splitting ratio up to ±0.005. Note that the difference between the mean splitting ratio obtained from the optimization procedure and the actual mean splitting ratio is quite small. Note also that this difference reduces with increasing number of spatial modes, as can be seen in FIG. 8 (showing the accuracy of the method as a function of the number of spatial modes in the interferometer), thereby confirming that the method's reliability increases with larger chip size.

In some embodiments, an iterative method for identifying a "best" splitting ratio for all MZIs on a chip is similar to method set forth above (steps 1-3), but instead of light being incident at only one input port of the interferometer and measuring the light intensity at the output ports, steps 2 and 3 are repeated for every other input port as well. In other words, while the N-mode interferometer is configured to implement the same fixed unitary operator (e.g., as selected using the procedure described above), the light intensity can be measured at each output port for every possible input port, to produce a plurality of measured light intensities.

Figure 9:
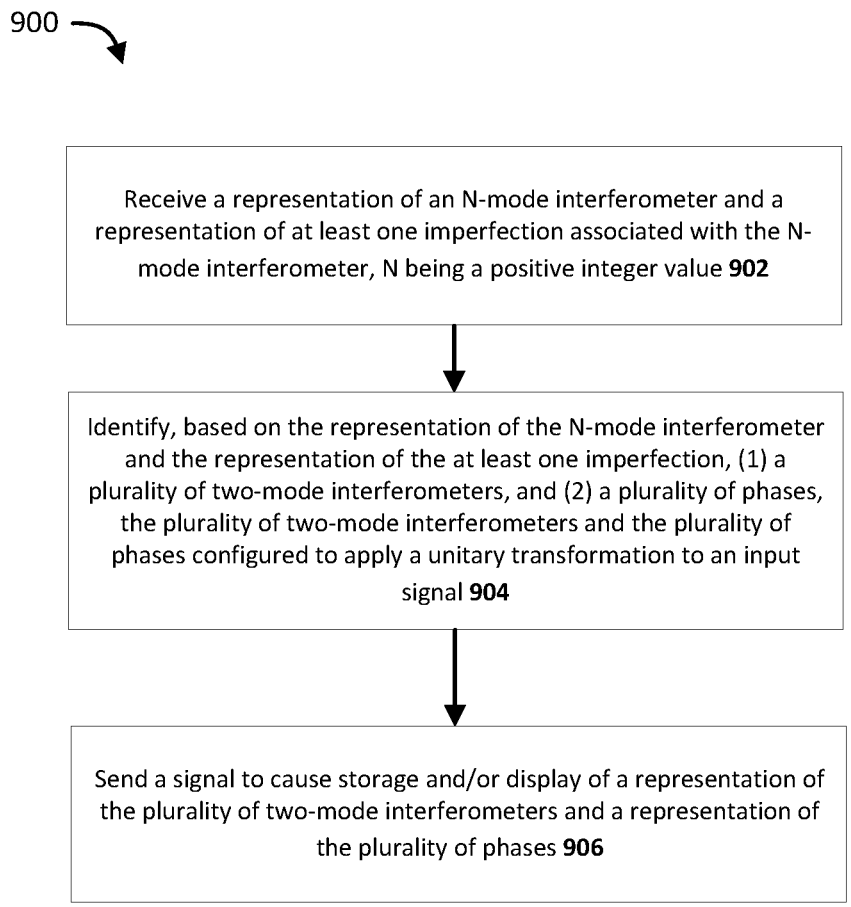
FIG. 9 is a flow diagram showing a decomposition method for use in implementing a desired unitary while taking into account at least one imperfection, according to an embodiment.

FIG. 9 is a flow diagram showing a decomposition method for use in implementing a desired unitary while taking into account at least one imperfection, according to an embodiment. As shown in FIG. 9, the method 900 includes receiving, at 902, a representation of an N-mode interferometer (e.g., a linear optical interferometer) and a representation of at least one imperfection associated with the N-mode interferometer at a processor, N being a positive integer value. As used herein, a "representation" of an interferometer can refer to a text-based or numeric value to indicate a selected/desired interferometer, for example input by a user via a graphical user interface (GUI) or sent to the processor from a compute device of the user in response to a user interaction with the compute device. In some embodiments, the at least one imperfection includes a splitting ratio that is different from a desired splitting ratio. The processor identifies, at 904, multiple two-mode interferometers and multiple phases based on the representation of the N-mode interferometer and the representation of the at least one imperfection. The multiple two-mode interferometers and the multiple phases are configured to apply a unitary transformation to an input signal. The method 900 also includes sending a signal, at 906, to cause at least one of storage or display of a representation of the multiple two-mode interferometers and a representation of the multiple phases. The method 900 optionally also includes implementing the plurality of two-mode interferometers using a plurality of optical components (e.g., beamsplitters, phaseshifters, waveguides, etc.). The method 900 optionally also includes receiving, at the processor and prior to the identifying the plurality of two-mode interferometers and the plurality of phases, a signal representing a user selection of the unitary transformation.

In some embodiments, the N-mode interferometer includes at least one beamsplitter, and the method 900 also includes identifying the at least one imperfection associated with the N-mode interferometer by, for each beamsplitter from the at least one beamsplitter: setting that beamsplitter to a cross state, setting each remaining beamsplitter from the plurality of beamsplitters to a bar state, causing light to be incident at an input port of that beamsplitter, and measuring a light intensity at each output port of that beamsplitter. The at least one imperfection is calculated based on the measured light intensities.

In some embodiments, the at least one imperfection is a plurality of imperfections, and the method 900 also includes identifying the plurality of imperfections by calculating a plurality of expected light intensities for the N-mode interferometer based on a first plurality of estimated splitting ratios, causing light to be incident at an input port of the N-mode interferometer, the N-mode interferometer configured to implement a fixed unitary operator, measuring a light intensity at each output port of the N-mode interferometer, to produce a plurality of measured light intensities, comparing the plurality of measured light intensities to the plurality of expected light intensities, and iteratively estimating additional pluralities of splitting ratios and associated expected light intensities, based on the comparing, to identify a plurality of splitting ratios having associated expected light intensities that are closest to the measured light intensities, the plurality of imperfections including the plurality of splitting ratios having associated expected light intensities that are closest to the measured light intensities.

In some embodiments, identifying the plurality of two-mode interferometers includes performing a decomposition of the unitary transformation. The decomposition can be based on a measured reflectivity value of a beamsplitter from the N-mode interferometer. In other embodiments, identifying the plurality of two-mode interferometers includes sequentially nulling elements of a matrix of the unitary transformation to produce a diagonal matrix, and inverting the diagonal matrix.

In some embodiments, the plurality of two-mode interferometers is configured to implement the unitary transformation with balanced optical losses.

In some embodiments, each two-mode interferometer from the plurality of two-mode interferometers is an imperfect Mach-Zehnder interferometer.

In some embodiments, a system includes a processor and a memory. The memory stores instructions to cause the processor to receive a representation of a linear optical interferometer and a representation of at least one splitting ratio associated with the linear optical interferometer. The memory also stores instructions to cause the processor to identify a plurality of two-mode interferometers based on the representation of the linear optical interferometer and the representation of the at least one splitting ratio. In some implementations, each two-mode interferometer from the plurality of two-mode interferometers is an imperfect Mach-Zehnder interferometer. The memory also stores instructions to cause the processor to identify a plurality of phases based on the representation of the linear optical interferometer and the representation of the at least one splitting ratio. The memory also stores instructions to cause the processor to send a signal to a chip (e.g., for implementation of the plurality of two-mode interferometers) and/or to cause display, via a graphical user interface, of a representation of the plurality of two-mode interferometers and a representation of the plurality of phases, the plurality of two-mode interferometers and the plurality of phases configured to apply a unitary transformation to an input signal. In some embodiments, the memory also stores instructions to cause the processor to receive a signal representing a user selection of the unitary transformation.

In some embodiments, the instructions to cause the processor to identify the plurality of two-mode interferometers include instructions to perform a decomposition of the unitary transformation.

In some embodiments, the instructions to cause the processor to identify the plurality of two-mode interferometers include instructions to perform a decomposition of the unitary transformation, the decomposition based on a measured reflectivity value of a beamsplitter.

In some embodiments, the instructions to cause the processor to identify the plurality of two-mode interferometers include instructions to (1) sequentially null elements of the unitary transformation to produce a diagonal matrix, and (2) invert the diagonal matrix.

In some embodiments, the linear optical interferometer includes at least one beamsplitter, and the memory further stores instructions to cause the processor to identify at least one imperfection associated with the linear optical interferometer by, for each beamsplitter from the at least one beamsplitter: setting that beamsplitter to a cross state, setting each remaining beamsplitter from the plurality of beamsplitters to a bar state, causing light to be incident at an input port of that beamsplitter, and measuring a light intensity at each output port of that beamsplitter. The at least one imperfection is calculated based on the measured light intensities.

In some embodiments, the memory also stores instructions to cause the processor to identify a plurality of imperfections by calculating a plurality of expected light intensities for the linear optical interferometer based on a first plurality of estimated splitting ratios and causing light to be incident at an input port of the linear optical interferometer. A light intensity is measured at each output port of the linear optical interferometer, to produce a plurality of measured light intensities. The plurality of measured light intensities is compared to the plurality of expected light intensities, and iterative estimates of additional pluralities of splitting ratios and associated expected light intensities are generated, based on the comparison, to identify a plurality of splitting ratios having associated expected light intensities that are closest to the measured light intensities, the plurality of imperfections including the plurality of splitting ratios having associated expected light intensities that are closest to the measured light intensities.

Example Modular Approaches

In some embodiments, a modular approach for implementing unitaries using imperfect beamsplitters includes a decomposition step and an implementation step. During the decomposition step (also referred to herein as factorization), a given unitary matrix U(N) that characterizes a unitary transformation is expressed as a product of several smaller unitary matrices U(M), where N and M are the number of optical modes for unitary transformations, and M is less than N. During the implementation step, the decomposition is implemented using optical components. For example, U(2) (i.e., M=2) transformations can be achieved by beamsplitters that act on different spatial modes of light or different temporal modes connected via optical delay lines. For M>2, the obtained U(M) transformations can be used to implement transformations on the combined spatial and internal degrees of freedom of light, such as polarization and orbital angular momentum, or on the combined temporal and spatial modes of light. More details to implement a U(M) transformation are described below.

Without loss of generality, a given unitary matrix U describes a linear optical transformation that maps the bosonic annihilation and creation operators $[\alpha_i, \alpha_i^\dagger]$ (and similarly for the Hermitian conjugates) according to:

$$a_i \rightarrow a_i' = \sum_{j=1}^{N} U_{ij} a_j \qquad (19)$$

The decomposition procedure results in a sequence of smaller unitary transformations, each of which can be realized using optical elements (e.g., one or more beamsplitters).

In some instances, decompositions rely on nulling the entries of the matrix U by multiplying it with simpler matrices. The nulling is typically performed using matrices in the form $T_{mn}(\theta,\phi)$, which is a N×N matrix and differs from the N×N identity matrix $I_N$ only in the entries at the intersection of the m-th and n-th rows and columns. These elements are:

$$\begin{pmatrix} \cos\theta e^{i\phi} & -\sin\theta \\ \sin\theta e^{i\phi} & \cos\theta \end{pmatrix} \qquad (20)$$

More specifically, the $T_{mn}(\theta,\phi)$ matrix (assuming m<n) can be written as:

$$T_{mn}(\theta,\phi) \stackrel{\text{def}}{=} \begin{pmatrix} 1 & & & & \\ & \ddots & & & \\ & & e^{i\phi}\cos\theta & -\sin\theta & \\ & & & \ddots & \\ & & e^{i\phi}\sin\theta & \cos\theta & \\ & & & & \ddots \\ & & & & & 1 \end{pmatrix} \qquad (21)$$

where the diagonal dots represent unity elements and the elements that are not shown are zero. The locations of the elements $e^{i\phi}\cos\theta$, $-\sin\theta$, $e^{i\phi}\sin\theta$, and $\cos\theta$ are (m, m), (m, n), (n, m), and (n, n), respectively.

The inverse of the $T_{mn}$ matrices can be written as:

$$T_{mn}^{-1}(\theta,\phi) = \begin{pmatrix} 1 & & & & \\ & \ddots & & & \\ & & e^{-i\phi}\cos\theta & e^{-i\phi}\sin\theta & \\ & & & \ddots & \\ & & -\sin\theta & \cos\theta & \\ & & & & \ddots \\ & & & & & 1 \end{pmatrix} \qquad (22)$$

Henceforth, the arguments θ and ϕ are dropped to simplify the notation.

Given input matrices can be multiplied by the $T_{mn}$ and $T_{mn}^{-1}$ matrices to null their elements. For example, multiplying a given matrix with $T_{mn}^{-1}$ from the right leads to a new matrix that is identical to the old one except in columns m and n, which are now mixed together with weights given by the elements of $T_{mn}^{-1}$. Parameters θ and ϕ can be chosen such that the mixing results in one element out of these two columns being nulled, i.e., becoming zero after multiplication. Therefore, a sequence of $T_{mn}$ and $T_{mn}^{-1}$ matrices can be applied to a given matrix to null each non-diagonal element in the given matrix.

Based on the above, at least two types of decompositions can be used in the modular approach described herein. The first type of decomposition is referred to as the elimination-based decomposition and the second type of decomposition is referred to as the cosine-sine (CS) decomposition. Each type of decomposition and the corresponding implementation is described below.

The elimination-based decomposition groups elements from neighboring modes in N input modes together into M-mode universal transformations and specialized (2M-3)-mode residual transformations. As used herein, a universal transformation refers to a general M-mode transformation that can be implemented with a linear optical interferometer. M-mode universal transformations are parametrized by $M^2-1$ free, real-valued parameters. A residual transformation refers to a specialized M-mode transformation that is parametrized by fewer than $M^2-1$ free, real-valued parameters.

The elimination-based decomposition is achieved by systematically nulling the entries of a unitary matrix by multiplying the unitary matrix with $T_{mn}$ from the left and $T_{mn}^{-1}$ from the right. Such systematic nulling results in a rectangular structure (also referred to as a rectangular architecture) of the optical circuit that implements the decomposition. In a rectangular structure, input optical modes travel through roughly the same number of optical elements in the optical circuit, thereby leading to balanced optical losses among these input optical modes. In contrast, known methods of unitary matrix decomposition generally result in a triangular architecture, where different input optical modes travel through different numbers of optical components and therefore incur different losses (e.g., the difference can be tens of times). In addition, the maximum optical losses incurred by any mode in the rectangular architecture can be much less (e.g., about 50% less) than the maximum optical losses in the triangular architecture implementing the same transformation.

To illustrate the elimination-based decomposition, the following description uses, as an example, a general SU(7) matrix $U_7$ that is decomposed into U(3) matrices. The method described herein can be extended to other unitary matrices as well. Without loss of generality, the matrix $U_7$ can be written as:

$$\begin{pmatrix} * & E^{12,r}_{(1,2)} & E^{11,r}_{(2,3)} & D^{10\ell}_{(1,2)} & D^{8\ell}_{(1,2)} & A^{2,r}_{(5,6)} & A^{1,r}_{(6,7)} \\ & * & E^{13,r}_{(2,3)} & F^{14,r}_{(2,4)} & D^{9\ell}_{(2,3)} & C^{7\ell}_{(2,4)} & A^{3,r}_{(6,7)} \\ & & * & G^{16,r}_{(3,4)} & G^{15,r}_{(4,5)} & B^{6\ell}_{(3,4)} & B^{4\ell}_{(3,4)} \\ & & & * & G^{17,r}_{(4,5)} & H^{18,r}_{(4,6)} & B^{5\ell}_{(4,5)} \\ & & & & * & I^{20,r}_{(5,6)} & I^{19,r}_{(6,7)} \\ & & & & & * & I^{21,r}_{(6,7)} \\ & & & & & & * \end{pmatrix} \quad (23)$$

In Equation (23), the bottom off-diagonal part is omitted for simplicity because $U^H = U^{-1}$. In general, the elements in $U_7$ are complex-valued and they are divided into nine groups labelled by capital letters E, D, A, F, C, G, B, H, and I. In addition, the subscript (m, n) for each element indicates the $T_{mn}$ matrix that is used to null this element. The superscript l or r indicates whether the element is nulled by multiplying the $U_7$ with a $T_{mn}$ matrix from the left (i.e., l) or a $T_{mn}^{-1}$ matrix from the right (i.e., r).

The elimination-based decomposition of $U_7$ begins by nulling the three elements in group A by multiplying $U_7$ from the right, i.e., $U_7 \rightarrow U_7(T_{67}T_{56}T_{67})^{-1}$. This nulling can be realized because the elements in group A are within a triangular block. Then the T matrices in the parenthesis can be grouped together into U(3) matrices (denoted as $A^{-1_5 \ldots 7}$) acting on three adjacent rows (i.e., rows 5 to 7) in $U_7$ and leaving the other rows unchanged, i.e., $U_7 \rightarrow U_7 A^{-1_5 \ldots 7}$.

The next step involves a multiplication from the left according to: $U_7 A^{-1_5 \ldots 7} \rightarrow (T_{34}T_{45}T_{34}) U_7 A^{-1_5 \ldots 7} = B^{-1_3 \ldots 5} U_7 A^{-1_5 \ldots 7}$, where $B^{-1_3 \ldots 5}$ is a U(3) matrix that acts on rows 3 to 5 in $U7 A^{-1_5 \ldots 7}$ and leaves other rows unchanged. This alternation between nulling from the left and nulling from the right leads to the rectangular structure of the optical circuit that implements the decomposition.

The above nulling process is then repeated for all groups and the matrix U7 can be decomposed into: $D^{-1_1 \ldots 3} C^{-1_2 \ldots 4} B^{-1_3 \ldots 5} U_7 A^{-1_5 \ldots 7} E^{-1_1 \ldots 3} F^{-1_2 \ldots 4} G^{-1_3 \ldots 5} H^{-1_4 \ldots 6} I^{-1_5 \ldots 7} = D'_7$, where $D'_7$ is a diagonal unitary matrix. The matrices A through I can be moved to the right-hand side by taking the inverse of each matrix and the matrix $U_7$ can now be written as: $U_7 = D_7 B_{3 \ldots 5} C_{2 \ldots 4} D_{1 \ldots 3} I_{5 \ldots 7} H_{4 \ldots 6} G_{3 \ldots 5} F_{2 \ldots 4} E_{1 \ldots 3} A_{5 \ldots 7}$. In other words, the matrix $U_7$ is decomposed into U(3) matrices B, C, D, I, H, G, F, E, and A. The diagonal phase matrix is absorbed into the other matrices. Out of the nine matrices in the decomposition, matrices A, B, D, E, G, and I are universal matrices representing universal transformations, and matrices C, F, and H are residual matrices representing residual transformations.

Clements Rectangular Architecture

Decomposition—The Clements decomposition improves over that of Reck by providing a rectangular circuit structure in which each mode is acted upon by no more than N beam-splitters. The rectangular structure is obtained by nulling the elements of the given unitary matrix systematically from the right and also from the left. More specifically, $U_5$ is nulled by multiplying it with $T_{mn}$ matrices from the right and $T_{mn}^{-1}$ matrices from the left. For example, an SU(5) matrix U can be converted to a diagonal matrix in the order:

$$U_5 T_{12}^{-1} \rightarrow T_{45} T_{34} U_5 T_{12}^{-1}$$
$$\rightarrow T_{45} T_{34} U_5 T_{12}^{-1} T_{34}^{-1} T_{23}^{-1} T_{12}^{-1}$$
$$\rightarrow T_{45} T_{34} T_{23} T_{12} T_{45} T_{34} U_5 T_{12}^{-1} T_{34}^{-1} T_{23}^{-1} T_{12}^{-1}$$

which leads to $$T_{45} T_{34} T_{23} T_{12} T_{45} T_{34} U_5 T_{12}^{-1} T_{34}^{-1} T_{23}^{-1} T_{12}^{-1} = \mathbb{D}_5 \quad (24)$$

or equivalently $$U_5 = T_{45}^{-1} T_{34}^{-1} T_{23}^{-1} T_{12}^{-1} T_{45}^{-1} T_{34}^{-1} \mathbb{D}_5 T_{12} T_{23} T_{34} T_{12}. \quad (25)$$

In Eq. (25), the diagonal matrix $\mathbb{D}_5$ appears in the middle of the decomposition, however these additional phases can be moved through the $T^{-1}$ matrices as follows. New matrices $T'_{mn}$ and $\mathbb{D}'_5$ are constructed such that $T_{mn}^{-1} \mathbb{D}_5 = \mathbb{D}'_5 T'_{mn}$. For the construction of such matrices, consider operators acting on the two-mode subspace:

$$T(\theta, \phi) = \begin{pmatrix} e^{i\phi}\cos\theta & -\sin\theta \\ e^{i\phi}\sin\theta & \cos\theta \end{pmatrix}, \quad (26)$$

$$D(\alpha, \beta) = \begin{pmatrix} e^{i\alpha} & 0 \\ 0 & e^{i\beta} \end{pmatrix}. \quad (27)$$

For these matrices, $$T^{-1}(\theta, \phi) D(\alpha, \beta) = \begin{pmatrix} e^{i(\alpha-\phi)}\cos\theta & e^{i(\beta-\phi)}\sin\theta \\ -e^{i\alpha}\sin\theta & e^{i\beta}\cos\theta \end{pmatrix}, \quad (28)$$

which is equal to $D'(\alpha'\beta')T(\theta',\phi')$ for $\alpha' = \beta - \phi + \pi$ $\beta' = \beta$ $\theta' = \theta$ $\phi' = \alpha - \beta + \pi \quad (29)$ Thus, the phases can be moved, two at a time, through the T matrices using $D'(\alpha'\beta')T(\theta',\phi') = T^{-1}(\theta,\phi)D(\alpha,\beta)$. By moving all the phases to the left of the equation, the following decomposition is obtained:

$$U_5 = \mathbb{D}_5 T_{34} T_{45} T_{12} T_{23} T_{34} T_{45} T_{12} T_{23} T_{34} T_{12}. \quad (30)$$

This decomposition has a rectangular structure, in which five T matrices act on each of the modes except the first and last mode, on which three and two gates act respectively.

Implementation—The Clements decomposition results in a spatial implementation that has optimal circuit depth. As in the Reck architecture, the $T_{mn}$ and D matrices are implemented as beam-splitters and phase-shifters acting on different spatial modes. In contrast to the Reck implementation, however, the first and last mode are acted upon by $\lceil(N+1)/2\rceil=3$ and $\lfloor(N-1)/2\rfloor=2$ beam-splitters and the remaining modes are acted upon by N=5 beam-splitters. Thus, the circuit depth of this architecture is N, which is the minimal possible depth for spatial circuits.

Furthermore, as each of the pulses traverses a similar number of optical elements, losses acting on the light are balanced. If the losses acting on each of the modes are exactly identical, then the actual realized transformation differs from the desired unitary by a constant multiplicative factor. This multiplicative factor can be mitigated in post-selection based linear optics protocols such as boson sampling but can pose substantial challenges to other protocols such as Gaussian boson sampling. Postselection based linear optics protocols are tasks in which not all outcomes are returned to the user, but rather only those that have a specific pre-specified characteristic. For example, in Boson sampling, outcomes are of the form of detected photon number patterns, and only those patterns are returned that have the same number of total detected photons as those that were incident at the input.

The Clements decomposition can also be implemented in the temporal modes of light. The switching pattern required to implement this decomposition is seen by grouping the factors of the decomposition into layers according to:

$$U_5 = \mathbb{D}_5 T_{34} T_{45} T_{12} T_{23} T_{34} T_{45} T_{12} T_{23} T_{34} T_{12} \quad (31)$$
$$= \mathbb{D}_5 (T_{34} T_{45})(T_{12} T_{23} T_{34} T_{45})(T_{12} T_{23} T_{34})(T_{12}). \quad (32)$$

This implementation requires the same N−1=4 looped beam-splitters as in the temporal implementation of Reck.

While various embodiments have been described and illustrated herein, a variety of other means and/or structures for performing the function and/or obtaining the results and/or one or more of the advantages described herein, and each of such variations and/or modifications are possible. More generally, all parameters, dimensions, materials, and configurations described herein are meant to be examples and that the actual parameters, dimensions, materials, and/or configurations will depend upon the specific application or applications for which the disclosure is used. It is to be understood that the foregoing embodiments are presented by way of example only and that other embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
   identifying at least one imperfection associated with an N-mode interferometer that includes at least one beamsplitter, N being a positive integer value, by:
      for each beamsplitter from the at least one beamsplitter:
         causing that beamsplitter to be set to a cross state,
         causing each remaining beamsplitter from the plurality of beamsplitters to be set to a bar state,
         causing light to be incident at an input port of that beamsplitter, and
         causing a light intensity to be measured at each output port of that beamsplitter; and
      calculating the at least one imperfection based on the measured light intensities;
   identifying, via a processor and based on a representation of the N-mode interferometer and a representation of the at least one imperfection, (1) a plurality of two mode interferometers, and (2) a plurality of phases, the plurality of two-mode interferometers and the plurality of phases configured to apply a unitary transformation to an input signal; and
   sending a signal to cause at least one of storage or display of a representation of the plurality of two-mode interferometers and a representation of the plurality of phases.

2. The method of claim 1, wherein the N-mode interferometer is a linear optical interferometer.

3. The method of claim 1, wherein the at least one imperfection includes a splitting ratio that is different from a desired splitting ratio.

4. The method of claim 1, further comprising implementing the plurality of two-mode interferometers using a plurality of optical components.

5. The method of claim 1, wherein the at least one imperfection is a plurality of imperfections, the method further comprising identifying the plurality of imperfections by:
   calculating a plurality of expected light intensities for the N-mode interferometer based on a first plurality of estimated splitting ratios;
   causing light to be incident at an input port of the N-mode interferometer, the N-mode interferometer configured to implement a fixed unitary operator;
   causing a light intensity to be measured at each output port of the N-mode interferometer, to produce a plurality of measured light intensities;
   comparing the plurality of measured light intensities to the plurality of expected light intensities; and
   iteratively estimating additional pluralities of splitting ratios and associated expected light intensities, based on the comparing, to identify a plurality of splitting ratios having associated expected light intensities that are closest to the measured light intensities, the plurality of imperfections including the plurality of splitting ratios having associated expected light intensities that are closest to the plurality of measured light intensities.

6. The method of claim 1, wherein the identifying the plurality of two-mode interferometers includes performing a decomposition of the unitary transformation.

7. The method of claim 1, wherein the identifying the plurality of two-mode interferometers includes performing a decomposition of the unitary transformation, the decomposition based on a measured reflectivity value of a beamsplitter from the at least one beamsplitter included in the N-mode interferometer.

8. The method of claim 1, wherein the identifying the plurality of two-mode interferometers includes sequentially nulling elements of a matrix of the unitary transformation to produce a diagonal matrix and inverting the diagonal matrix.

9. The method of claim 1, wherein the plurality of two-mode interferometers is configured to implement the unitary transformation with balanced optical losses.

10. The method of claim 1, wherein each two-mode interferometer from the plurality of two-mode interferometers is an imperfect Mach-Zehnder interferometer.

11. The method of claim 1, further comprising receiving, at the processor and prior to the identifying the plurality of two-mode interferometers and the plurality of phases, a signal representing a user selection of the unitary transformation.

12. A system, comprising:
   a processor; and
   a memory storing instructions to cause the processor to:
      identify at least one imperfection associated with a linear optical interferometer that includes at least one beamsplitter, by:
         for each beamsplitter from the at least one beamsplitter:
            causing that beamsplitter to be set to a cross state,
            causing each remaining beamsplitter from the plurality of beamsplitters to be set to a bar state,
            causing light to be incident at an input port of that beamsplitter, and
            causing a light intensity to be measured at each output port of that beamsplitter; and
         calculating the at least one imperfection based on the measured light intensities;
      identify a plurality of two-mode interferometers based on a representation of the linear optical interferometer and a representation of at least one splitting ratio;
      identify a plurality of phases based on the representation of the linear optical interferometer and the representation of the at least one splitting ratio; and
      send a signal at least one of: (1) to a chip for implementation of the plurality of two-mode interferometers; or (2) to cause display, via a graphical user interface, of a representation of the plurality of two-mode interferometers and a representation of the plurality of phases, the plurality of two-mode interferometers and the plurality of phases configured to apply a unitary transformation to an input signal.

13. The system of claim 12, wherein the instructions to cause the processor to identify the plurality of two-mode interferometers include instructions to perform a decomposition of the unitary transformation.

14. The system of claim 12, wherein the instructions to cause the processor to identify the plurality of two-mode interferometers include instructions to perform a decomposition of the unitary transformation, the decomposition based on a measured reflectivity value of a beamsplitter from the at least one beamsplitter included in the linear optical interferometer.

15. The system of claim 12, wherein the instructions to cause the processor to identify the plurality of two-mode interferometers include instructions to (1) sequentially null elements of the unitary transformation to produce a diagonal matrix, and (2) invert the diagonal matrix.

16. The system of claim 12, wherein each two-mode interferometer from the plurality of two-mode interferometers is an imperfect Mach-Zehnder interferometer.

17. The system of claim 12, wherein the memory further stores instructions to cause the processor to identify a plurality of imperfections by:
- calculating a plurality of expected light intensities for the linear optical interferometer based on a first plurality of estimated splitting ratios;
- causing light to be incident at an input port of the linear optical interferometer;
- causing a light intensity to be measured at each output port of the linear optical interferometer, to produce a plurality of measured light intensities;
- comparing the plurality of measured light intensities to the plurality of expected light intensities; and
- iteratively estimating additional pluralities of splitting ratios and associated expected light intensities, based on the comparison, to identify a plurality of splitting ratios having associated expected light intensities that are closest to the measured light intensities, the plurality of imperfections including the plurality of splitting ratios having associated expected light intensities that are closest to the measured light intensities.

18. The system of claim 12, wherein the memory further stores instructions to cause the processor to receive a signal representing a user selection of the unitary transformation.

* * * * *